Figure 1:
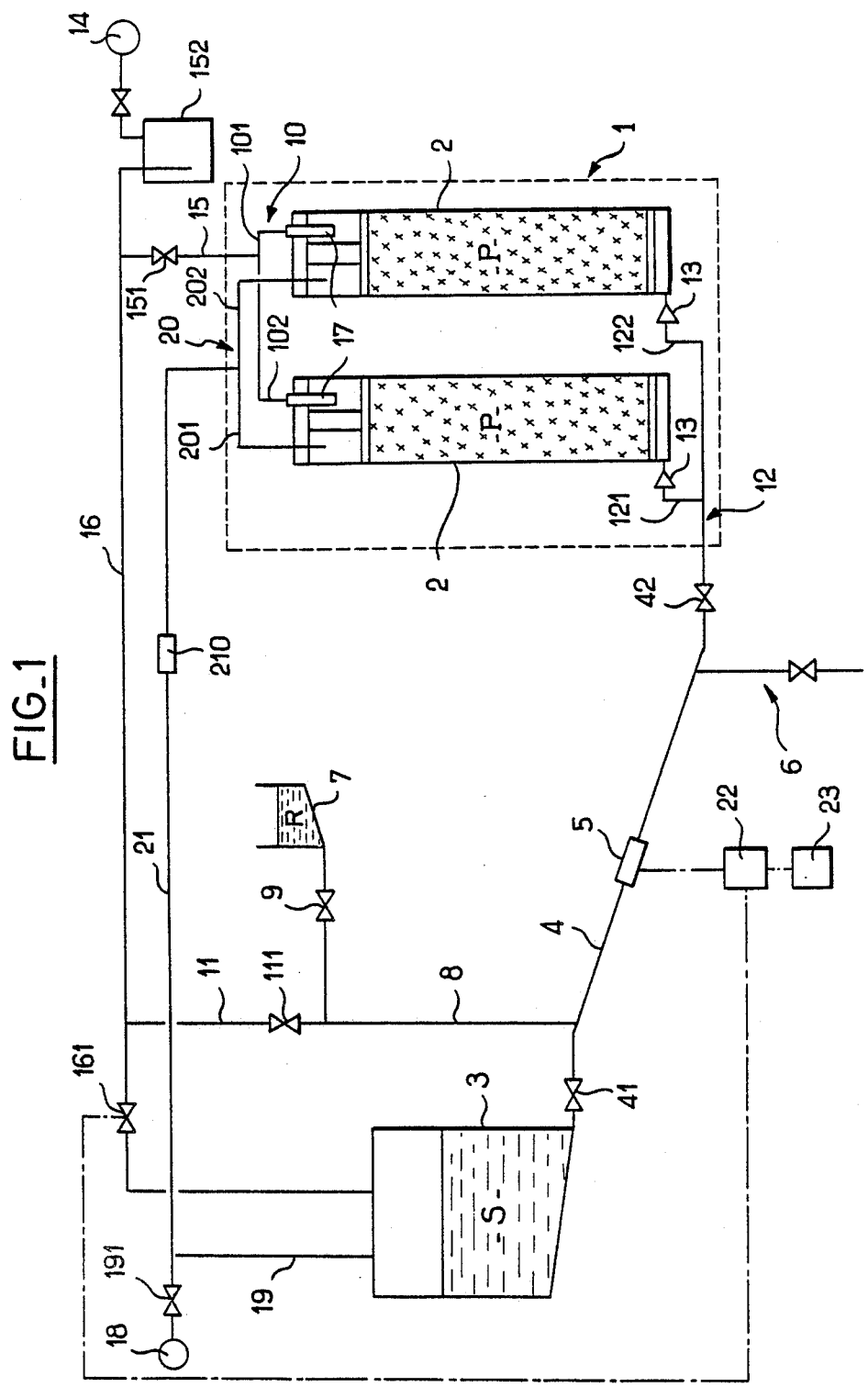

United States Patent [19]

Dupont

[11] Patent Number: 4,730,534

[45] Date of Patent: Mar. 15, 1988

[54] PLANT FOR REALIZING THE RUNNING-IN OF A FLUID COMPRISING AN EXPLOSIBLE COMPONENT

[75] Inventor: Jean-Marcel Dupont, Angouleme, France

[73] Assignee: Societe Nationale des Poudres et Explosifs, Paris, France

[21] Appl. No.: 829,498

[22] Filed: Feb. 14, 1986

[30] Foreign Application Priority Data

Feb. 14, 1985 [FR] France .................................. 85 02094

[51] Int. Cl.$^4$ ................................................ F42B 3/00
[52] U.S. Cl. ...................................... 86/20.12; 86/20.1
[58] Field of Search .......................... 264/3.1, 3.3, 3.4; 86/20.12, 20.14, 20.1

[56] References Cited

U.S. PATENT DOCUMENTS

| | | | |
|---|---|---|---|
| 3,600,486 | 8/1971 | Walker et al. | 264/3.1 X |
| 3,663,148 | 5/1972 | Walker et al. | 264/3.1 X |
| 3,706,257 | 12/1972 | Collman | 86/20.14 |
| 3,943,820 | 3/1976 | Persson | 264/3.1 X |
| 4,014,655 | 3/1977 | Brunnberg | 264/3.3 X |
| 4,421,004 | 12/1983 | Hallström et al. | 264/3.1 X |

Primary Examiner—Peter A. Nelson
Attorney, Agent, or Firm—Burns, Doane, Swecker & Mathis

[57] ABSTRACT

The invention relates to a process for realizing the running-in of a fluid comprising at least an explosible component sensitive to shocks and/or rubbing.

The process of the invention consists in filling the moulds 2 with a specified quantity of casting powder P, in running-in a casting solvent S into the moulds 2 placed under reduced pressure, and in then curing the blocks thus cast to gel the casting powder. The running-in of the casting solvent S into the mould 2 from the storage tank 3, and the beginning and the end of this running-in of the casting solvent are controlled by controlling the pressure difference existing between the pressure prevailing in the storage tank and that prevailing in the mould 2. Thus, it is possible to control the running-in of the casting solvent into the moulds remotely.

The present invention applies especially in the industry for the manufacture of solid propellant compositions.

4 Claims, 3 Drawing Figures

FIG_1

U.S. Patent  Mar. 15, 1988  Sheet 2 of 2  4,730,534

PLANT FOR REALIZING THE RUNNING-IN OF A FLUID COMPRISING AN EXPLOSIBLE COMPONENT

The present invention relates to a process for realizing the running-in of a fluid comprising at least an explosible component sensitive to shocks and/or rubbing.

It concerns, more particularly, a process and a plant for carrying out the running-in of the casting solvent in the casting method for propellant blocks.

The casting method, or "in-situ casting process" is the name given to the process which consists in filling the mould with a nitrocellulose-based casting powder, and running-in under pressure or under reduced pressure a casting solvent consisting of a nitrated oil such as nitroglycerine, for example. As it absorbs the casting solvent, the casting powder swells and gels to form a compact mass which will then be cured to produce the final block.

There is another method of manufacture referred to as the global method, or the "slurry casting process", which consists in mixing all the components of the propellant and then running-in this mixture into a mould and curing the whole to make it set solid.

A description of these two processes is given in U.S. Pat. No. 4,080,411. The choice between these processes is determined by the required properties of the final propellant.

The casting method comprises three successive steps:

A first step consisting in filling the mould with a casting powder, to produce a specified depth of powder with a filling ratio (mass of powder per volume) which is also specified, these two characteristics determining, on the one hand, the size of the block and, on the other hand, its mechanical and combustion characteristics.

A second step consisting in running-in a casting solvent into the mould to impregnate completely the casting powder. This running-in is carried out in a mould either under reduced pressure or at atmospheric pressure, and so that the casting solvent expels the gases enclosed in the powder as it progresses in the mould. The casting solvent is absorbed by the casting powder, causing the latter to swell and to gel. The running-in of the casting solvent is stopped when the casting powder is completely submerged in the solvent, that is to say when the level of the casting solvent in the mould is situated above the level of the casting powder.

The third step consists in carrying out the maturing and the cure of the cast blocks thus obtained.

The process according to the invention relates, more particularly, to the second step of the casting method described hereabove, the first and third steps being capable of being implemented according to processes which are known to the specialist.

The running-in of fluids comprising an explosible component is generally handworkly carried out, for example by gravity flowing through a flexible conduit and controlling of the rate by pinching of the conduit, or by pouring out the fluid into a container.

These processes require the manipulation of dangerous fluid by personnel, and during the running-in of fluid, shocks and rubbing which can be produced may generate an explosion of fluid.

In the process of manufacture of propellant blocks by the casting method, several processes are used for carrying out the running-in of the casting solvent into one or more moulds. In these processes, the running-in of the casting solvent is carried out under pressure, the end of the running-in being determined by visual inspection of the solvent level in the mould. Consequently, these processes require personnel to be continually present in the casting shop, which is a major disadvantage from the standpoint of safety. In addition, in the case where running-in into several moulds takes place simultaneously, the operators must watch the level of the casting solvent in each mould and stop the running-in of the solvent mould by mould, which increases the number of handling operations of a hazardous product and can even require several operators to be present depending on the number of moulds filled simultaneously. Devices which enable the level of casting solvent in the mould to be detected automatically, such as, for example, photoelectric cells, have also been proposed. However, these devices do not dispose of the need for the operator to stop the running-in of the solvent in each mould.

Furthermore, in these various methods, before the start of the running-in of the casting solvent, there is a large difference in pressure between the tank in which the solvent is stored and the mould. As a result, the solvent comes into contact with the casting powder at a relatively high flow velocity, which can give rise to impacts and frictions and cause detonation of the nitrated oil.

The present invention is aimed in particular at overcoming the disadvantages by providing a process for realizing the running-in of a fluid comprising an explosible component enabling the beginning and the end of the running-in of the fluid into a container and the rate of running-in, to be remotely controlled, to produce a considerable improvement in safety. This process is advantageously used for carrying out the running-in of the casting solvent in the process of manufacture of propellant blocks by the casting method. Also, the process makes simultaneous filling of several moulds possible with the running-in of the solvent into each mould being stopped automatically and independently to the other moulds.

To this end, the invention provides a process for realizing the running-in of a fluid comprising at least an explosible component from a storage tank into one or several containers which are placed under reduced pressure, characterized in that the beginning, the end of the running-in of said fluid(S) and the rate of running-in are controlled by monitoring and controlling the pressure difference existing between the pressure prevailing in the said storage tank (3) and that prevailing in each container (2).

This process is used for carrying out the running-in of the casting solvent in the process for manufacture of propellant blocks by the casting method consisting in supply to one or more moulds a specified quantity of casting powder, in running-in a casting solvent into the said mould or moulds which is, or are, placed under reduced pressure, and in then curing the block or blocks thus obtained to gel the casting powder.

According to another characteristic of the invention, each mould and each storage tank are connected to a vacuum source and a source of supply of compressed gas.

Preferably, the casting solvent is contained in a single storage tank connected to all the moulds.

According to another characteristic of the invention, the command for the running-in of the casting solvent to end is given automatically and independently for each mould by the rise in the level of the casting solvent in the mould, causing the communication between the source of vacuum and the corresponding mould to be interrupted, while the mould remains in communication with the source of supply of compressed gas. Thus, the mould is placed under a pressure which is substantially equal to that prevailing in the storage tank, which causes the running-in of the casting solvent to stop.

Furthermore, the beginning of the running-in is achieved, according to the process of the invention, by balancing the pressures prevailing in the storage tank and each mould to cause the casting solvent to flow under gravity. Thus, the rate of flow of the casting solvent coming into contact with the casting powder is very low, which reduces the frictions and impacts and consequently the exploding risk of the nitrated oils.

Another subject of the invention is a plant for implementing the process for the manufacture of blocks of propellant by the casting method, and which essentially comprises one or more moulds connected to a storage tank for the casting solvent, a supply of compressed gas and a source of vacuum, characterized in that the storage tank for the casting solvent and the moulds are connected, on the one hand, to the source of vacuum and, on the other hand, to the supply of compressed gas. In addition, each mould is connected to the source of vacuum through the intermediacy of a float valve situated in the upper part of the said mould.

Advantageously, this float valve comprises a movable float arranged in a cage fixed at the end of a conduit, the other end of this conduit being connected to the source of vacuum.

According to another characteristic of the invention, and to provide better control of the end of the running-in of the casting solvent, the moulds are connected to the source of supply of compressed gas through the intermediacy of a calibrated orifice.

Figure 2:
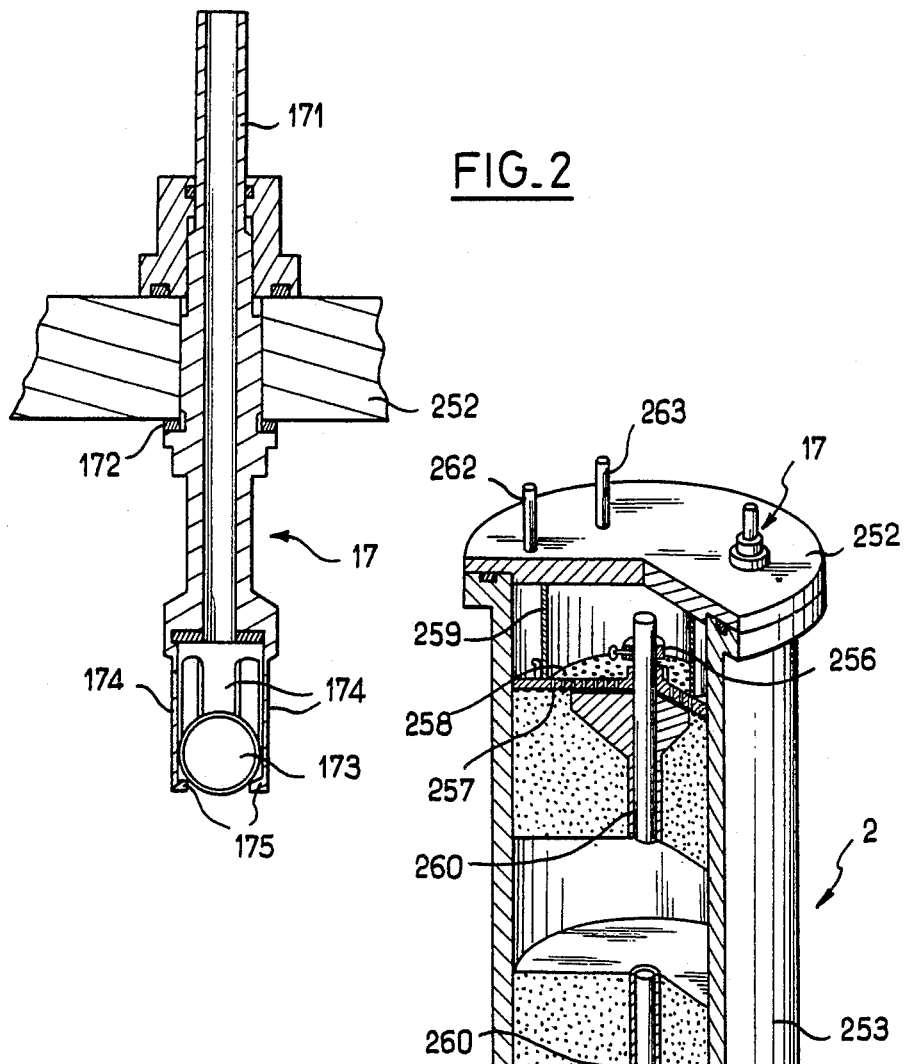
Figure 3:
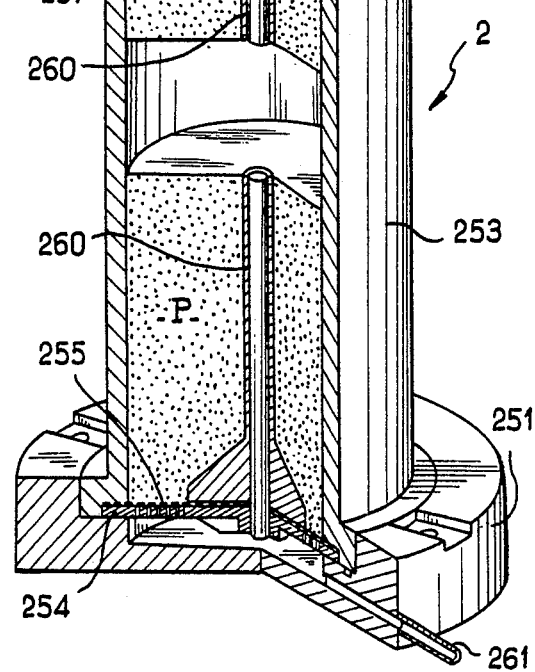

Other characteristics, advantages and details of the invention will become more clearly apparent from the detailed description given below with reference to the attached drawings which are given solely by way of illustration, and in which:

FIG. 1 is a general diagram of the plant for implementing the process of the invention, FIG. 2 is a view in lengthwise section of the float valve mounted on each mould, and FIG. 3 is a diagrammatic perspective view, with cutaway, of a mould.

To a better understanding of the invention, the process and plant of the invention are hebelow described in details for the carrying out of the second step of the process for manufacture of propellant block by the casting method which is described earlier.

Although, the process according to the invention can be used for running-in of every fluid comprising at least an explosible component into a container which is under reduced pressure.

A plant according to the invention, which permits the running-in of a casting solvent S into the moulds 2 already filled with a casting powder P to be carried out, will be described with reference to FIG. 1, the summary description of a type of mould being given below, with reference to FIG. 3.

The plant comprises moulds 2 arranged on a pallet 1 and a storage tank 3 containing the casting solvent S.

There may be any number of moulds 2 on the pallet 1, and, for example, the number may be equal to one.

The casting powder P consists essentially of nitrocellulose granules which are generally stabilized and, if appropriate, contain plasticizers and ballistic additives.

The casting solvent S is a phlegmatized nitrated oil such as, for example, nitroglycerine.

The process of the invention makes it possible to manufacture blocks of propellant obtained from a casting powder and a casting solvent of variable compositions. The propellants obtained are homogeneous propellants and generally double-base propellants.

The pallet 1 advantageously comprises a casting solvent dispenser 12 consisting of a solvent deliverer and a number of dispensing conduits 121, 122, equipped with nonreturn valves 13, each of which is connected to a mould 2.

The storage tank 3 for the casting solvent S is connected to the dispenser on the pallet 1 by a supply line 4 and valves 41, 42. A flowmeter 5 is advantageously fitted in this line 4.

In addition, this line 4 comprises a purge system 6 consisting of a branching connection fitted with a valve, and is connected to a storage tank 7 containing a rinsing liquid R via the line 8 and the valve 9.

In accordance with the invention, the plant comprises a source of vacuum 14 connected via the conduits 15 and 16, and valves 151 and 161, respectively, to a manifold 10 on the pallet 1 and to the storage tank 3.

The line 4 is preferably also connected to the source of vacuum 14 via the line 11 and the valve 111.

According to an important characteristic of the invention, the distribution conduits 101, 102 of the manifold 10 on the pallet 1 are connected to the upper part of the moulds 2, through the intermediacy of a float valve 17 fixed on the cover of the mould 2, an embodiment of which is illustrated in FIG. 2.

This float valve comprises a tube 171 mounted hermetically on the cover of the mould 2, for example using a fitting with seals 172, as illustrated in FIG. 2. However, this valve can also be welded to the cover of the mould 2, or fixed by any other means. The end of the tube 171 which opens outside the mould is connected to one of the conduits of the vacuum distributor 10 and its other end comprises tongues 174 forming a cage in which a float 173 can move axially. To keep the float 173 in the cage, the ends of the tongues 174 have a rib 175. Moreover, the end of the tube 171 is advantageously given a shape which is a function of that of the float 173, so as to form a seat for the said float to provide a leakproof closure of the tube 171 when the float 173 is in its high position.

The float 173 has a density which is lower than that of the casting solvent and is, for example, a Teflon sphere. The shape of the float is not critical and is adapted to produce a shutting-off of the tube 171 which is as leakproof as possible.

It is preferable to provide a trap 157 in the tubing 15, to prevent any casting solvent from being drawn into the source of vacuum 14.

The source of vacuum 14 makes it possible to obtain a pressure reduction of the order of 50 mbar in the moulds 2 and the storage tank 3.

According to the invention the plant comprises a source of supply 18 of compressed gas, for example compressed air. This source is connected, on the one hand, to the storage tank 3 via the line 19 and to the moulds 2 via the line 21, the manifold 20 and the distribution conduits 201, 202.

Since the communication between the compressed gas supply 18 and the moulds 2 is kept open during the entire phase of running-in of the casting solvent, the supply line 21 contains a calibrated orifice 210 to produce a pressure reduction in the moulds 2.

The compressed gas supply line 19 and the vacuum source line 16, which are connected to the storage tank comprise valves 191, 161, respectively, which make it possible to change the pressure prevailing in the storage tank 3. Advantageously, these valves 191, 161 can be servo-controlled by the flowmeter 5 measurement, by means of a transmitter 22 and a controller 23, for example. Thus, the plant can be programmed by setting the required flowrate.

The electrical control connections are shown as dot-and-dash lines.

The pressure of the compressed gas supplied is in the region of approximately 1.5 bar. However, this value is given only as an indication and can vary as a function of the required rate of running-in of the casting solvent, and of the nature of the mould filling.

A summary description of a mould 2 used in the process of the invention will be given with reference to FIG. 3. However, this description is given only by way of example, and moulds of any known types can be used, after they have been fitted with a vacuum take-off equipped with the float valve 17, and a compressed air delivery connection.

The mould 2 comprises a base plate 251, a cover or cap 252 and a tube 253.

In its lower part, the tube comprises a perforated disk 254 forming a filter on which a metal cloth 255 is arranged. This grid-disk assembly forms the support plate for the casting powder P fed into the mould. Similarly, a metal cloth 257 and a perforated disk 258 forming the upper filter are arranged on the casting powder. To retain the casting powder in the mould, a spacer 259 is interposed between the cover 252 and the upper filter, the cover being fixed onto the tube 253 by bolting or clamping, for example.

In the embodiment shown in FIG. 3, a star-shaped central core 260 is arranged between the two filters, thus to produce a block of propellant with radial combustion. An end stop 256 is provided on the upper part of this central core.

The supply of the casting solvent is fed in via a radial bore 261 in the base plate 251.

The cover comprises a branch 262 for compressed air delivery and is equipped with the float valve 17 illustrated in FIG. 2. Advantageously, the cover 252 can comprise a third branch 263, closed by a stopper during the running-in of the casting solvent, to make it possible to draw off the excess casting solvent lying above the upper filter.

Examples of other types of moulds which can be used in the plant of the invention and which can be mentioned are those described in French Pat. Nos. 1,179,415, 2,042,S50 and 1,530,751.

The operation of the plant will now be described with reference to FIG. 1.

The moulds 2 filled with the casting powder P are arranged on the pallet 1 and connected to the casting solvent supply line 4, and to the compressed gas source 18 and the vacuum source 14, via the manifolds 12, 20, 10.

Similarly, the casting solvent storage tank 3 is connected to the line 4 and to the sources 14,18 of vacuum and of compressed gas.

At the same moment, the mould 2, the casting solvent storage tank 3 and the supply line 4 are placed under reduced pressure. The valves 41,42 are then opened to allow the casting solvent to flow under gravity through the line 4 as far as the moulds 2. Thus, the contact between the casting solvent and the casting powder takes place without impact, and the solvent flow can be detected by the flowmeter.

When the casting solvent is in contact with the casting powder, the communication between the storage tank 3 and the vacuum source 14 is closed and the communication between the compressed gas source 18 and the storage tank 3 and the moulds 2 is opened. The pressure prevailing in the storage tank increases, while the moulds are kept at a reduced pressure by the suction of the vacuum source 14, and by virtue of the calibrated orifice 210 provided in the compressed gas supply line 21. The rate of supply of the casting solvent increases and can be monitored by reading the flowmeter and adjusting the pressure in the storage tank 3.

When the level of the casting solvent in a mould 2 comes above the upper filter in the mould, it causes the float 173 of the valve 17 to rise in its cage. Under the effect of the suction in the tube 171, the float 173 is applied against the valve seat, thus causing the communication with the vacuum source 14 to be cut. Since compressed gas is supplied continuously to the mould, the pressure prevailing in the latter increases and equilibrates with that prevailing in the storage tank 3, causing the running-in of the casting solvent into the mould to stop automatically.

To prevent any backflow of casting solvent into another mould, or into the solvent supply line 4, a nonreturn valve 13 is provided in each line 121,122 of the dispenser 12.

The process of stopping the running-in of the casting solvent is repeated in each mould 2, without affecting the running-in of the solvent into the other moulds 2 arranged on the pallet 1.

When all the moulds are filled, the valve 41 is closed and the line 4 is drained by opening the purge 6. The line 4 is then rinsed by opening the valve 9.

All these opening and closing operations of the valves described above are remotely controlled, thus enabling the personnel not to be present in the shop during the entire operation of running-in of the casting solvent.

Thus, in the process of the invention, the personnel is present in the shop only to make the connection and disconnection of the casting solvent dispenser, vacuum and compressed air manifolds on the pallet 1. Furthermore, when the moulds are disconnected, the conduits, especially the line 4, no longer contain the casting solvent, which improves safety further.

The blocks cast in this manner are then subjected to a heat treatment to complete the gelling of the casting powder. This heat treatment, known to the specialist, can be carried out after demoulding or before demoulding. Preferably, a preliminary maturing is effected before demoulding, but after the excess casting solvent has been drawn-off by suction through the branch 263 (FIG. 2). After demoulding, the blocks are then subjected to a thermal cure process.

The process of the invention thus makes it possible to control remotely the running-in of the casting solvent into the moulds, whatever the number of moulds filled simultaneously, and the quantity of the solvent required to fill them. Thus, it is possible to carry out the running-in of casting solvent simultaneously into two moulds of different sizes, the running-in of the solvent into the smaller mould being stopped automatically without affecting the running-in of the solvent into the other mould.

The same applies when the rate of supply of the casting solvent to the moulds is different.

Furthermore, since the valve operation takes place remotely, the entire process of running-in the casting solvent can be automated.

I claim:

1. Plant for the manufacture of a block of propellant by the casting method, comprising at least one mold, at least one storage tank for the casting solvent connected to said mold, a source of compressed gas, and a source of vacuum, wherein said storage tank for said casting solvent and said mold both are connected to said source of vaccum and to said source of compressed gas, and wherein said mold is connected to said source of vacuum by means of a float valve situated in the upper part of said mold.

2. Plant according to claim 1, characterized in that the abovementioned mould is connected to the source of compressed gas through a calibrated orifice.

3. Plant according to claim 1, characterized in that the abovementioned float valve comprises a shutter float arranged so that it can move in a cage fixed to the end of a conduit, the other end of the said conduit being connected to the source of vacuum.

4. Plant according to claim 1, characterized in that a nonreturn valve is provided in each conduit for supplying casting solvent into the abovementioned mould.

* * * * *